Patented Apr. 28, 1953

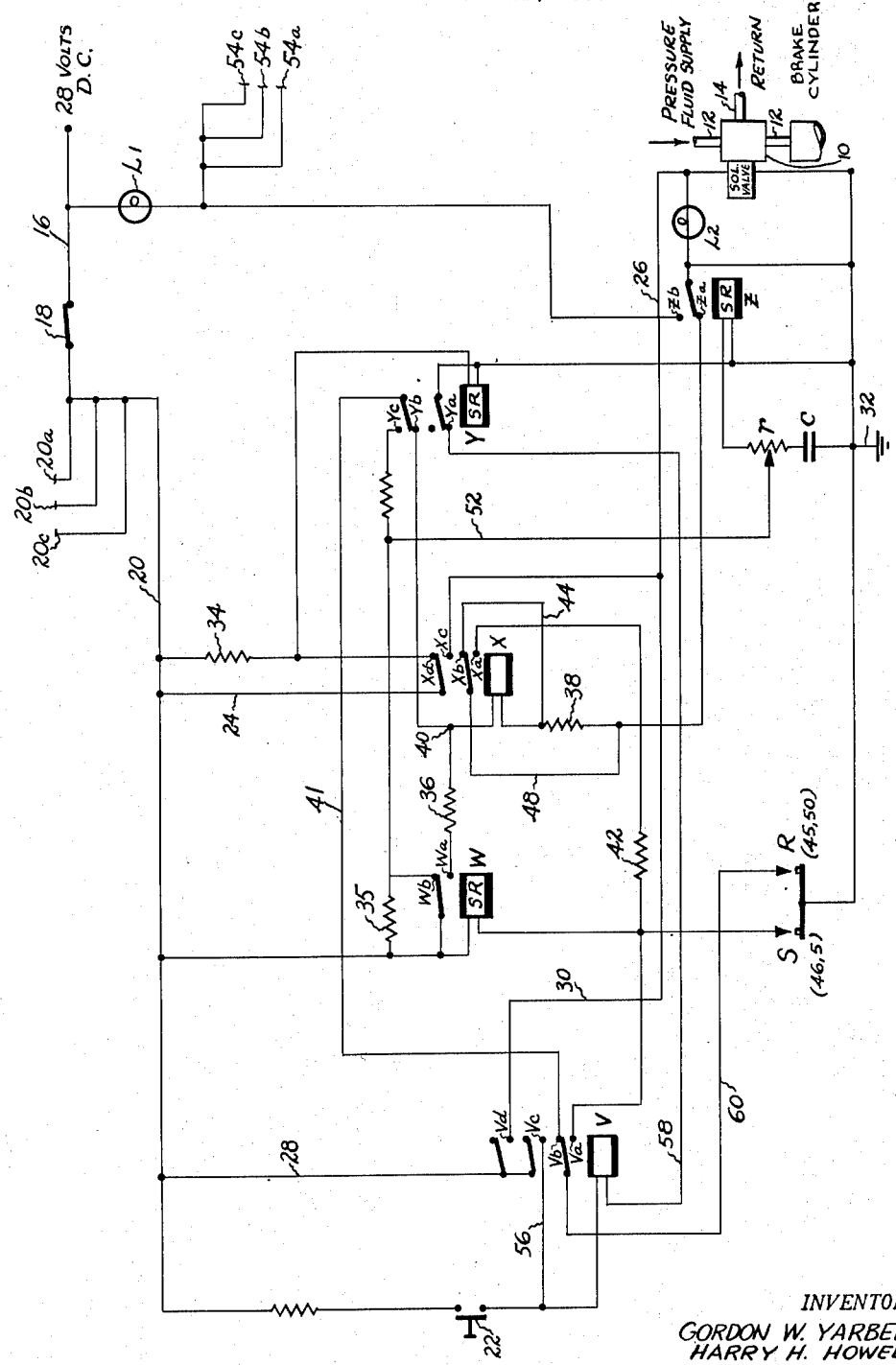

2,636,700

UNITED STATES PATENT OFFICE 2,636,700

AIRPLANE LANDING WHEEL BRAKE CONTROL APPARATUS

Gordon W. Yarber, near Seattle, and Harry H. Howell and Rush F. Chase, Seattle, Wash., assignors to Boeing Airplane Company, Seattle, Wash., a corporation of Delaware Application February 21, 1950, Serial No. 145,368

19 Claims. (Cl. 244—111)

1

This invention relates to automatic brake control apparatus for preventing skidding of an airplane's landing wheels by application of excessive brake pressure. Reference is made to the copending application of Gordon W. Yarber, Serial No. 90,965, filed May 2, 1949, disclosing automatic brake control mechanism for a similar purpose. A broad object of our present invention is to provide automatic brake control apparatus which will operate effectively under the widely diverse airplane landing conditions which may arise and affect the control requirements.

Automatic control of braking is especially advantageous in the case of larger type airplanes. It is normally difficult for a pilot to bring a large airplane to a stop consistently in the shortest achievable landing run by most efficient use of wheel brakes, because he cannot readily sense skidding and also because of the human reaction time element. Skidding causes wear and frequently failure of tires. Also, "ground looping" can result if the airplane enters an uncontrolled skid. Moreover, a skidding wheel actually produces less frictional resistance, hence less deceleration of the aircraft than a wheel braked just to the verge of skidding, for example.

Wheel deceleration and acceleration detecting mechanism is disclosed in the copending application cited above. Our present invention utilizes basic mechanism, preferably of that type, although it is directed primarily to an entire automatic brake control system or apparatus, in which the detecting mechanism is but an element. As in the copending application, such detecting mechanism actuates follow-up or control means, preferably comprising an electric circuit, operable to relieve brake pressure in response to detection of the beginning of a skid. When thus released, the wheels recover speed, and when that occurs braking is automatically restored. Such removal and restoration of braking pressure may occur intermittently a number of times during a landing run and may be accomplished in the usual case involving hydraulically-operated brakes by energizing and deenergizing a solenoid valve located in the hydraulic brake fluid supply line.

The detecting mechanism referred to above includes a wheel-rotated member or flywheel which is spun by rotation of the airplane landing wheels when they first contact the ground. Should the wheels tend to skid thereafter the resultant drop in wheel speed below the speed of the flywheel acting as a speed reference, actuates skid-detector electric contacts, which in turn actuate the control circuit. The latter energizes the valve which removes pressure-fluid from the brake mechanism, the same being accomplished before the skid develops beyond its incipient stage. As a result, complete skidding, that is locking of the landing wheels by excessive brake pressure, is automatically prevented, and instead an average braking pressure is attained, corresponding to that which would keep the wheels substantially at the verge of skidding.

Our present invention chiefly pertains to improvement modifications or control refinements implemented by a novel control circuit or equivalent means for converting signals from the detector mechanism into control operation of the hydraulic valve or similar brake-releasing device in a system of the type mentioned.

An object is to improve the reliability of the automatic control, and more particularly to remove a former limitation therein resulting from the requirement that the reference flywheel be initially spun by the landing wheels in order to condition the detector mechanism for skid-detecting operation. If the pilot accidentally locked the landing wheels before and at initial ground contact, they would skid immediately and the flywheel would not be rotated. Such a skid would remain undetected.

Accordingly, the improved automatic control means or circuit includes a circuit interlock which is conditioned before landing and insures that the landing wheels, hence the flywheel, will be rotated as the airplane lands, independent of errors of judgment of the pilot in operating the brake controls as mentioned above. The interlock effectively makes it impossible for the pilot to lock, and thereby skid the wheels accidentally at the instant of initial ground contact.

A further and related object is to insure removal or disablement of the interlock, and restoration of automatically controlled braking as soon as practicable after initial ground contact. Accordingly, the control circuit includes interlock release means responsive to actuation of the wheel-speed-recovery detector, such detector responding to initial spinning of the landing wheels as well as to speed recovery acceleration thereof following release of the brakes when the wheels tend to skid during the ensuing landing run.

A further object of the invention is to prevent premature removal of the interlock and restoration of brake pressure, such as in the case of a faulty or bounce landing. This is desirable because if the flywheel retards sufficiently of its own accord in the interval between successive bounces, for instance, to the point where its speed is no longer sufficient to enable detecting a skid, then, as in the case of locked wheels upon initial ground contact, over-application of brake pressure by the pilot could bring on a dangerous skid which would develop undetected.

In light of this object the control circuit includes holding means operable to prolong the effectiveness of the interlock for a determinable short period of time immediately following initial actuation of the wheel-speed-recovery detector. The period of prolongation has a maximum set length, but it can be shortened and controlled braking established correspondingly sooner by a further or continuing signal from the wheel-speed-recovery detector, as in the case of a perfect landing.

Still another and important object is to provide automatic anti-skid control which imposes its effect upon the pilot-controlled braking system in a manner conducive to maximum braking efficiency. It is important, for example, that no time be lost between recovery of wheel speed after detection and elimination of a tendency to skid, and restoration of brake pressure. It is found desirable, therefore, to compensate for hydraulic and mechanical lags in the brake applying mechanism proper. Preferably such compensation is achieved by utilizing a characteristic of the speed-recovery detector mechanism, namely its ability to produce a detection signal somewhat in advance of the actual attainment of full recovery speed of the wheel. The amount of this anticipation afforded by the detection mechanism normally is made substantially equal to the lag in the brake applying mechanism, the relationship varying somewhat with landing conditions.

Moreover, it is found to be essential to controlled braking efficiency that braking pressure not be restored too soon following release of the brakes in response to a skid detection signal. If the brakes are reapplied much before the wheel recovers speed in these circumstances, a succeeding skid will tend to develop more quickly than if restoration of braking pressure is deferred until substantially full recovery of wheel speed has taken place. As a result, over an ensuing period of alternate relief and premature restoration of braking pressure, braking efficiency progressively degenerates to a low value. Noting that the wheel-speed-recovery detector inherently produces a detection signal somewhat in advance of the wheels attaining their full recovery speed, the detecting mechanism itself affords no direct indication of when the latter occurs. Moreover, the problem is complicated further by the fact that the rate of wheel-speed recovery varies materially with the coefficient of friction of the runway.

In accordance with further features of the invention it was discovered that the foregoing requirement for efficient braking can be satisfied by resolving the complications mentioned into a comparatively simple basis or criterion of control with respect to timing restoration of braking pressure following detection and interruption of an incipient skid condition. For practical purposes in the control operation it was found that runways may be divided into two classes according to whether their coefficients of friction, as affecting rate of wheel-speed recovery, are above or below a certain empirically determined value. The apparatus itself makes this determination in a given design installation on the basis of time lapse between a skid detection signal and the succeeding wheel-speed-recovery signal. On a runway classified on the preceding basis as "slippery" this time lapse will be longer than a certain amount, whereas it will be shorter than that amount if the coefficient of friction of the runway is sufficiently high to be considered "non-slippery." In a typical case the driving line was represented by a time lapse period of about 0.45 second, although the amount might vary permissibly between 0.4 and 0.6 second, for example, without materially affecting braking efficiency, that is, without causing restoration of braking pressure following a skid, much too soon or too late.

On the basis of the foregoing determination automatically made by the control apparatus the brakes are reapplied substantially immediately following reception of the wheel-speed-recovery signal if the time lapse mentioned is less than the empirically predetermined amount, but if it is more than that amount the control circuit interposes a predetermined short delay, such as 0.75 second in a typical case, between reception of the wheel-speed-recovery signal and restoration of braking pressure. This further delay affords additional time for the wheels to recover full speed in the case of "slippery" runways, on which the wheels are slower to recover speed. A slow-release relay having a normal release time of about 0.45 second, but which may vary between 0.4 and 0.6 second due to effects of temperature and line voltage variations on its operation, in the typical case previously mentioned, provides a reference for automatic determination of time lapse between detection of skid and detection of wheel-speed recovery. If runways are to be divided into a greater number of classes than the two mentioned above in order to attain still greater accuracy in timing the automatic restoration of braking pressure following a detected skid, for maximum braking efficiency, then one or more additional slow-release relays or the like will be required.

As a further feature of the control circuit the release time of the relay just described is also utilized as a basis of establishing the desired amount of prolongation of the electric interlock after initial ground contact. To the delay period of this relay is added a further increment of circuit delay which has a maximum limit at which the interlock is removed in any event, but which can be foreshortened in the event of a further actuation of the recovery detector as in the case of a normal landing.

The control circuit embodies still another slow-release relay through energization of which such circuit operatively responds to skid signals. Its purpose is briefly described as follows. Should the skid-and-recovery detecting mechanism, in shifting from skid detecting position to neutral position, overshoot the neutral and reach the recovery detecting position, a false recovery signal would be produced even though the mechanism returns to neutral immediately thereafter. The slow-release feature of this relay prevents the circuit from permanently responding as if to a true recovery signal and returns it to the skid-sensitive operating condition.

Still other objects and related features of the apparatus include a so-called "fail-safe" provision whereby unrestricted control over braking is restored to the pilot automatically upon occurrence of any of various contingencies, such as in the event of a failure of electric power energizing the control circuit, or in the event of grounding or short-circuiting of various critical parts of the circuit, or of sticking of contacts, especially in the skid-detector switch. Another such contingency might arise after a predetermined maximum safe interval following a detected skid, in the event of continued failure for any reason of the wheel-speed-recovery detector switch to close and restore braking pressure. One reason this recovery detector switch may fail to reclose following skidding of the wheels may be found in the case of an extremely slippery runway, restoration of wheel rotational speed following skidding being extraordinarily slow; another reason is possible mechanical failure in the recovery detector means itself.

Yet another object is to avoid fluctuations of the solenoid valve due to chattering of the skid detector switch contacts during the incipient skid interval but prior to wheel speed recovery, for example. To this end the control circuit includes holding relay means which effects continuing relief of braking pressure in response to a short or intermittent skid detector signal, such as that caused by bouncing of that particular landing wheel or by intermittently recurring slipperiness of the runway upon which it rolls.

Each landing wheel preferably is subjected to separately controlled braking of the kind indicated and each separate braking control means embodies the features described.

Further features, objects and advantages of the invention will appear from the following detailed description thereof by reference to the accompanying circuit diagram. The circuit is intended, in effect, to substitute for the control circuit disclosed in the copending application of Gordon W. Yarber mentioned above, and to cooperate with the basic wheel skid and speed-recovery detection means described therein, in a manner which will become apparent. It is believed that enough has been and will be said generally concerning the detecting mechanism itself to make clear the operating characteristics thereof necessary to an understanding of the present improved control apparatus, without need herein for a detailed description and drawings of such mechanism.

In the preferred and illustrated case the system control operations are focused upon the solenoid valve 10 located in the pressure-fluid supply line 12 extending to hydraulic actuating mechanism of a wheel's brakes. Normally the brake fluid pressure valve is positioned to open this supply line and enable the pilot to vary the actual braking force at will by metering the pressure of fluid supplied to the brake-actuating mechanism. Each wheel is similarly controlled, and each wheel brake supply line 12 has a similar solenoid valve 10 connected therein. The diagram represents control apparatus for a single wheel's brake.

The solenoid valve 10 may be of any conventional three-way type suited for the purpose; and the valve details per se constitute no part of the present invention. When its solenoid is energized, flow of pressure-fluid through line 12 is cut off and diverted into a by-pass or return line 14 leading back to the pressure-fluid reservoir, resulting in relief of braking pressure. Such solenoid energization is accomplished by the control circuit to be described herein and was likewise accomplished by the control circuit disclosed in the copending patent application cited above. It is important to note, in either case, however, that the control circuit which energizes the solenoid valve under certain conditions to prevent skidding of the wheels does not interfere with direct pilot control over braking unless and until he applies excessive braking pressure to the point of initiating skidding. Thus the valve 10 is in general a selectively operated brake disabling means. Moreover, because of the fail-safe provision, previously mentioned, in no event can the control circuit's failure to operate, or the occurrence of a defect therein, leave the aircraft wheel without effective brakes; nor can pressure-fluid pocket in the brake actuating mechanism and lock the brakes, because valve 10 always returns to the line-open or pilot control position in the event of apparatus failure.

An indicator light $L_2$, connected across the valve solenoid, provides a visible indication to the pilot that excessive braking pressure is being applied and is being relieved by operation of the solenoid valve, and yet not for the purpose of warning him that the pilot-metered braking pressure should be reduced. Rather it indicates that the control circuit is operating effectively, because it is the intention herein that the pilot will usually, or at least can if he so desires, meter or establish a higher braking pressure than is actually needed for maximum braking below the point of skidding, and rely upon the automatic control apparatus to establish the desired lower effective average pressure, incipient to wheel skidding, for effecting maximum retardation of the airplane, as previously explained.

The control circuit in the aircraft application should be designed for operation from the standard 28 volt D. C. or other power supply normally available in airplanes. It should operate satisfactorily despite wide variations in supply voltage, as between 20 and 30 volts, for example, as may occur during a given landing. In the diagram circuit, current normally at 28 volts is supplied through conductor 16 when the main power switch 18 is closed. This switch may be closed manually or automatically by lowering of the landing gear preparatory to landing the airplane—preferably the latter, so that it will require no attention from the pilot who is already occupied with numerous duties. This energizes the conductor 20 to which different parts of the control circuit are connected to receive energizing current. Branch conductors 20A, 20B and 20C serve a similar purpose in corresponding control circuits (not shown) for the other landing wheels of the airplane, three such branch conductors being shown, and used in the case of an airplane having four separately-braked landing wheels.

By way of general introduction, when the on-off power switch 18 is initially closed or "on," control relays Y and Z become energized, and this is their normal operating condition, so referred to herein, during landing of the airplane. Correspondingly, the relays W and X are normally deenergized, but are subject to energization in tandem by closure of skid-detector switch contacts S corresponding to the contacts 46 and 5 described in the copending patent application cited above, or by energization of relay V followed by closure of wheel speed recovery contacts R (45, 50) at initial ground contact. The relay V is normally deenergized, but during the initial phase of landing, commencing prior to the touchdown, this relay is energized by momentary actuation of a so-called arming switch 22. The relay V and arming switch 22, operating in conjunction with the remainder of the circuit, provide the initial electric interlock feature described above, the effect of which is to insure that solenoid valve 10 cannot be deenergized until such time as there is first an initial ground contact of the landing wheel sufficient to spin the flywheel and condition the control circuit for control operation, as later explained. Relay V is deenergized by release of relay Y at a predetermined time following initial closure of contacts R.

In the ground roll, or run, phase of operation of the control circuit, that is, after the initial ground contact effects removal of the electric interlock by deenergization of relay V followed by opening of relays W and X if or when recovery contacts R are closed after Y releases, the solenoid valve is energized to relieve braking pressure only by reclosure of relay X, which, through its contacts Xc, supplies energizing current to the valve's solenoid through conductors 24 and 26. On the other hand, during the initial landing phase when the electric interlock relay V is energized for freeing the wheels preliminary to touch-down, energizing current is delivered to the valve's solenoid via conductor 26, through conductor 28, closed contacts Vd of relay V, and conductor 38 in series. Therefore, until the electric interlock is removed by deenergization of relay V, the solenoid valve is energized to insure that the brakes will not be applied no matter what may be the operating condition of relay X. It is immaterial, therefore, as to whether the pilot, before touch-down, inadvertently sets the brake pressure high enough to cause wheel lock and skidding when the wheels first strike the ground. Such pressure is then rendered ineffectual. Moreover, as mentioned above, in the case of an imperfect landing one or more of the respective relays W (also X) in the different wheel brake control circuits may perpetuate energization of valve 10 beyond the point of release of relay V, if recovery contacts R are not closed when slow-release relay Y releases in each such circuit.

The control circuit and its details of operation may be understood best, it is believed, by describing it in relation to the two distinct landing phases, namely the second or ground run landing phase which occurs after release of the electric interlock, and the initial landing phase during which such interlock is effective. Moreover, the second landing phase entails use of components and functioning thereof which are also basic to the combination and functioning of the circuit components operative during the initial landing phase, and so will be described first, although it will be understood that the actual sequence of these two distinct phases of operation is the converse of their order of description herein.

*Ground run landing phase*

It will be understood that the detector mechanism as disclosed in said copending application, includes an inertia member or flywheel by reference to the speed of which switch contacts 46, 5, designated S herein, are closed automatically in response to initiation of wheel skid, and also the switch contacts 46, 50, designated R herein, closed automatically in response to wheel speed recovery. More specifically, the recovery contacts R close whenever the airplane wheel is rotated at a speed which tends to exceed the instantaneous speed of the reference flywheel, and they close somewhat ahead of full recovery of wheel speed to provide a recovery signal which anticipates full recovery. There is a neutral position of the detector mechanism associated with the flywheel, in which neither of the contacts S or R is closed. This condition obtains when both the flywheel and the landing wheel are stationary, and also when they are rotating substantially in synchronism as, for instance, immediately following a rotational impetus imparted to the flywheel by acceleration of the airplane landing wheel tending to increase its speed above that of the flywheel. However, if the landing wheel suddenly decelerates as by initiation of skidding, the resulting speed differential, in relation to the flywheel as a reference, causes skid contacts S to close. The amount or degree of deceleration of the landing wheel relative to the flywheel necessary in order to actuate the skid contacts in this manner may be established at a desired or preferred value, depending upon the installation, as explained in said copending application. Moreover, the amount of acceleration of the landing wheel relative to the flywheel, that is, the degree of recovery of wheel speed, necessary to close the recovery contacts R, is similarly subject to choice in accordance with operating requirements. In a typical case, under normal landing conditions, contacts R were set to close by a few tenths of a second ahead of full recovery of wheel speed, such interval corresponding approximately to the lag between the recovery signal and actual application of brakes.

The field coil of relay W is connected directly between the energized conductor 20 and the skid contacts S, the lower one of which in the diagram is grounded at 32. When skid contacts S are closed, relay W is thereby energized. An immediate effect thereof is energization of relay X by connecting its field coil between energized conductor 20 and ground 32 through the lower contacts Wa of relay W, current-limiting resistor 36, the coil of relay X itself, current-limiting resistor 38, and the lower contacts Za of normally energized relay Z. Such energization of relay X immediately energizes the solenoid valve to relieve braking pressure, through conductors 24 and 26 and contacts Xc, as previously explained. The wheel skid then ceases and wheel speed recovery takes place at a rate depending, in a given case, upon the coefficient of friction of the runway and the proportion of weight of the aircraft then being carried by that landing wheel. Although contacts S may then quickly reopen, relay W remains energized through a holding circuit including resistor 42 and series contacts Xa and Za, as later mentioned in more detail.

If wheel speed recovery after wheel skid and release of brakes is comparatively immediate, as it will be when the wheels are bearing steadily on a "non-slippery" or comparatively tractionable runway, such as a runway having a friction coefficient above 0.3, for instance, recovery contacts R will be closed correspondingly soon following initial closure of skid contacts S. In that situation the upper or energized side of the field coil of relay X connected to the circuit junction 40 is then directly grounded through the still-closed contacts Yb of relay Y, conductor 41, closed contacts Vb of deenergized relay V, conductor 66, and the now-closed recovery contacts R. By short-circuiting relay X to ground in this manner, its contacts Xc open and conductor 26, hence solenoid valve 10, is deenergized, and pilot-metered braking pressure is again made available through the supply line 12 to reapply the brake. Its holding circuit being broken, relay W also is deenergized shortly after contacts R close, as later explained. Short-circuit current by-passing the coil of relay X through contacts Yb and Vb is limited by the small resistor 36, such as typically 60 ohms, for instance.

After wheel speed is recovered, contacts R again open and the circuit is restored to neutral condition, completing the anti-skid control cycle. The skid contacts S and contacts R remain in neutral or open position until wheel skidding again occurs, whereupon the skid contacts S again close and relays W and X become energized in the same sequence as previously to energize the solenoid valve 10 and again relieve braking pressure to release the wheels. Thereupon the cycle of operation just described repeats itself. If the pilot meters a steady brake fluid pressure in excess of that which produces skidding on the particular runway, the contacts S and R will alternate between open and closed position, and the circuit will hunt between the skid and wheel speed recovery conditions, producing an average effective braking pressure below skidding, but as high as possible within that limitation, with the result that the airplane is brought to rest in the shortest possible landing run. This accomplishment of maintaining a high average effective braking pressure below skidding is accomplished automatically without attention from the pilot, and is a result solely of his application or metering of what may be termed "full" effective braking pressure during the entire landing run.

It may be that under certain conditions release of skid contacts S may take place so energetically that momentary closure of recovery contacts R results, the flywheel-actuated mechanism overshooting its neutral position. At that time recovery contacts R are not required to close because wheel speed recovery had not yet occurred. It is important that such momentary false recovery signal be prevented from effecting a permanent or definite change in the operating condition of the circuit, short-circuiting relay X. This problem is conveniently solved by incorporating slow-release means in relay W, such as a conventional copper slug which carries induction currents opposing collapse of the relay field, and thereby introducing a short time lapse, such as 0.15 second, before the relay releases after its full energizing current through contacts S is interrupted. Hence, although relay X may be momentarily short-circuited by false actuation of contacts R, relay W remains unreleased long enough to reenergize relay X, hence itself, through a holding circuit to be described, until such time as a true recovery signal is received and utilized to deenergize solenoid valve 10 for reapplication of braking pressure to the brake mechanism.

Concerning relays W and X which participate jointly in effecting the foregoing described braking control operation, it will be noted, as previously mentioned, that a holding circuit for relay W is completed by energization of relay X, including resistor 42, closed contacts Xa, and the normally-closed lower contacts Za of relay Z to ground at 32. Thus, even if the closure of skid contacts S is but momentary or is erratic, or intermittent, the holding circuit nevertheless maintains a steady flow of energizing current to relay W in order to establish steady positioning of the solenoid valve 10. This smooths out the operation of the valve, hence of the brakes, independent of any tendency for contacts S or any of the relay contacts to chatter, or for an intermittent signal from skid detector contacts S for any reason. Resistor 42 limits holding current in relay W at a minimum value sufficient to maintain armature-holding energization thereof, so that the contacts of this relay, despite its slow-release feature, will spring quickly to the released or deenergized position at a time, for instance, following opening of the holding circuit when relay X is short-circuited by actuation of recovery contacts R. A quick release of relay W is desirable when it is being energized through its holding circuit, as distinguished from its initial energizing circuit including skid contacts S, because if the recovery contacts R chatter or close intermittently when they should be closed steadily any appreciable delay in the release of W at that time might cause X to operate erratically.

A conductor 44 directly interconnects the ground side of the field coil of relay X with its normally closed contacts Xb, which in turn are connected through a bridging conductor 48 directly to the normally closed contacts Za of relay Z, thence to ground at 32. These connections provide a by-pass around current-limiting resistor 38 which is included in the normal path for energizing current flowing through the coil of relay X. Faster operation or energization of relay X is thereby obtained, since an initial impulse of current passes through the relay coil which is greater than the normal energizing current therein, but this by-pass is immediately removed and resistor 38 connected in the relay energizing circuit upon operation of the relay to open its contacts Xb.

Certain delayed reactions are initiated in the circuit upon energization of relay W. Closure of skid contacts S and resulting energization of relays W and X interrupts the normal flow of energizing current through contacts Xd to the coil of relay Y from energized conductor 20. Current through relay Y, now limited by resistor 34, drops abruptly to a much lower value, below the amount necessary for holding in the relay. Relay Y is of the slow-release type, and resistor 34 is selected to be of such a size that, in conjunction with the slow-release means, such as a copper current-induction slug, in the relay proper, a predetermined delay, such as normally 0.45 second, is obtained in the actual release of relay Y following energization of relay W.

Relay Y is a timing device which determines, from the interval between closure of contacts S and subsequent closure of contacts R, how quickly braking should be restored, i. e. valve 10 actuated, once contacts R do close, as will be explained. Its delay interval of 0.45 second is merely illustrative, but was determined to be optimum in a typical and preferred installation. In that installation it was an approximate measure of the maximum lapse of time between a skid signal and subsequent recovery signal which would normally be expected under runway conditions approaching what might be classified as "slippery". In other words this emperically determined delay period represented the dividing line in a typical case, between runway conditions requiring immediate reapplication of brakes and those requiring further delay in reapplication of brakes, after the recovery signal. Such delay interval in that case could vary between 0.4 to 0.6 second as engine speed, hence generator voltage varied under different landing conditions representing a wide range of ambient temperatures such as might be encountered in the extremes of flying weather. Nevertheless, such variation can be tolerated and the release delay period of relay Y remains sufficiently definite to serve an important purpose.

The significance of the slow-release feature of relay Y, involving the 0.45 second delay interval, variable between 0.4 to 0.6 second, for instance, will now be explained in terms of circuit operation. After development of a skid is initiated on a "non-slippery" runway, such as one having a friction coefficient of more than 0.3, for example, relay W thereupon being energized through contacts S to effect interruption of normal energizing current to relay Y and initiate its delayed release, recovery contacts R will usually be expected to close before the lapse of the 0.4 to 0.6 second relay Y release delay period. It has been found in the illustrative case that braking should be restored, for most effective results, almost immediately after the recovery contacts R close, if they close within the period indicated. This is accomplished by short-circuiting relay X to ground through contacts Yb of still-unreleased relay Y, contacts Vb of relay V, and the recovery contacts R, as previously described. The recovery signal occurring somewhat ahead of full wheel speed recovery, as it does with the particular skid and recovery detecting mechanism, the brakes are then actually reapplied, despite mechanical lag, at approximately the instant such full recovery materializes in most cases, as desired. Full wheel speed recovery is thereby permitted to occur, yet controlled braking is restored immediately thereupon, a type of control which is found to give maximum braking efficiency.

However, if the runway is "slippery," having a friction coefficient of less than 0.3, for example, then a longer period of time should be allowed between the recovery signal and actual reapplication of brakes. After about one-fourth or more of the airplane's weight is carried by the landing wheels most runways even when wet will act as if of the "non-slippery" class on the basis herein described. An icy runway is, of course, another matter. The circuit determines the requirement of an additional delay in reapplication of brakes with sufficient accuracy by utilizing the delayed release of relay Y to mark the conveniently arbitrary, although empirically determined dividing line between requirements for efficient controlled braking on a "non-slippery" runway and those on a "slippery" runway. It has been found that if the recovery signal occurs, therefore, beyond the 0.4 to 0.6 second delay interval, then the brakes should not be applied immediately as in the previous situation, but a delay should be interposed to permit the wheels more time in which to regain full or synchronous speed, before the brakes are applied.

To this end the circuit includes further delay means conditioned for operation by release of relay Y and operated by closure of recovery contacts R to effect release of relay X, hence reapplication of brakes, at a predetermined time later, preferably after a delay of about 0.75 second, more or less, in a typical case. Such a means includes the relay Z, release of which opens contacts Za and deenergizes relay X thereby. Relay Z is also of the slow-release type, but its coil is connected across an R-C delay circuit, and is supplied with a small or sub-holding current from conductor 20 through a large resistor 35 and conductor 52, which gives it a much longer natural release period than slow-release relay Y. In the circuit, relay Z may have, and preferably has for reasons later explained, a natural maximum release period of as long as 3 or more seconds. This period can be foreshortened, however, by closure of recovery contacts R before expiration of such natural period.

Before release of relay Y the field coil of relay Z has been energized directly from conductor 20 through the closed contacts Wb of relay W, and conductor 52, by passing resistor 35. Following closure of relay W by closure of skid contacts S, relay Z is then connected to the energized conductor 20 through the large resistor 35 which limits current through relay Z to a value below its holding current, but such current, together with the delay imposed by the R-C circuit and with the release delay inherent in the relay itself, provides the long release delay period mentioned. The resistance-capacitance delay or storage circuit, including a resistor $r$, such as 500 ohms, and a condenser $c$, such as 500 microfarads, connected across the coil of relay Z, slowly delivers the normally retained charge of energy on condenser $c$ to relay Z following opening of contacts Wb and materially delays deenergization and release of relay Z. However, closure of recovery contacts $r$, occurring before the expiration of relay Z's natural release delay period, materially accelerates the discharge rate of condenser C by creating a by-pass circuit to ground through the now-closed contacts Yc and Vb. This greatly diminishes the residual current then flowing in the relay coil, so that it releases sooner. However, it will not release immediately upon closure of contacts R, but even when thus accelerated requires, in a typical case, about 0.75 second residual delay for actual release to take place. This interval varies somewhat depending upon the time lapse between energization of relay W and closure of recovery contacts R after relay Y releases. The interval tends to be longer if initiated immediately after relay Y releases, and shorter if at a later time, but the variation is not great or objectionable. Resistor $r$ may be varied to adjust this delay interval within limits.

As will now appear, therefore, closure of contacts R, if after relay Y releases, restores braking pressure in line 12 to the wheel brakes, but does so only after an additional delay of 0.75 second, more or less, over and above the inherent hydraulic mechanical lag in the brake system, as desired. Full recovery of wheel speed on a slippery runway is thereby assured and efficient, controlled braking obtained.

In the case of a "slippery" runway the period of oscillation or hunting of the circuit between the skid and brake-released conditions will be lengthened because of the greater wheel speed recovery time manifested on a "slippery" runway as compared with the shorter period required on a more tractionable runway.

If in the extraordinary case a recovery signal from closure of recovery contacts R is not received before the expiration of the described natural release period of relay Z to accelerate release of such relay, as mentioned, then the reason may be assigned to some difficulty or failure in the operation of the control mechanism or circuit which would prevent contacts R from closing. The same results would obtain by power failure in the system, by sticking of skid contacts S following closure thereof, by a short-circuit or ground in the circuit preventing release of relay Y, for instance, or by other difficulties any of which could occur during warfare, for instance. In short, there are various possible sources of trouble which might conceivably work to prevent normal restoration of braking pressure through deenergization of solenoid valve 10, and it is for this reason that slow-release relay Z with its release delay period of the amount indicated, for example, is employed. The natural release delay period of relay Z in the circuit is preferably selected to expire at a time beyond the occurrence of the most belated recovery signal which may be received in any of the expected or predictable operating or landing conditions of the apparatus. If, following a skid, the recovery contacts R are not closed within the delay period of relay Z, then something will have been amiss; relay Z will then release and cause opening of the energizing circuit to relay X, thereby deenergizing the valve solenoid to restore braking. In no event, therefore, is the airplane crippled by absence of braking, and yet the braking is always automatically controlled as mentioned, unless the apparatus fails as by damage in warfare.

When relay Z deenergizes, contacts Zb close and a light L₁ lights up, being then connected between energized conductor 16 and ground. When it remains lighted continuously the pilot knows that the automatic braking control has failed and that he must rely upon his own skill in manipulating the brakes, full control over which is always restore to him under such conditions, in order to bring the airplane to a speedy halt. Branch conductors 54a, 54b and 54c extend from the lower side of the trouble light L₁ to the upper contacts Zb of relays Z in the similar control circuits associated with the other landing wheels, so that if any of the control circuits develop trouble the pilot will be appraised thereof. Alternatively, a separate trouble light may be employed in each of the branch connections 54a, 54b and 54c, as well as in the circuit diagrammed.

*Initial landing phase (circuit interlock)*

After the landing airplane once settles steadily on the ground and all the wheels have been or are being rotated sufficiently to spin their respective reference flywheels and initiate operation of their individual automatic braking control circuits to prevent skidding, each such control circuit operates as previously described. However, in the process of bringing the airplane into its first contact with the runway, referred to as the "touch-down," it is possible that the pilot might accidentally apply or meter to the brakes before and at such touch-down, such high braking pressure that the touch-down is accompanied by a skid instead of by spinning of the wheels. Not only is this in itself dangerous because of the possibility of tire failure and loss of airplane control, but it is further dangerous and undesirable in the usual case because the skidding thus initiated will not be broken by the operation of the automatic control apparatus. For the latter to operate in order to stop a skid the airplane landing wheels must first be rotated to spin the flywheels by reference to which skid detection signals are obtained. Accordingly, a further important feature of the present invention resides in the precautionary provision of electric circuit interlock means, including the relay V and the arming switch 22. This interlock portion of the circuit operates automatically and its effect is to insure energization of solenoid valve 10 to divert pressure-fluid into by-pass line 14, so that the pilot cannot accidentally apply the brakes until the airplane has actually first landed. It is further desirable, however, that brake pressure be made available and the control circuit placed into normal operation with the interlock removed as soon as feasible upon landing or initial touch-down. Moreover, protection against initial skidding in the case of a non-perfect landing as when bouncing on the runway, or when landing in a cross-wind which causes the wheels on one side to make intermittent ground contact, is also taken into consideration in the nature and operation of the interlock circuit feature.

To these ends the relay V and the arming switch 22 cooperate with other parts of the circuit previously described to provide a more dependable and versatile control system successfully meeting a wider variety of landing conditions. Arming switch 22 is preferably of the momentarily operated type, and may comprise a simple push-button switch which the pilot presses momentarily preliminary to landing, or preferably an automatically operated type switch which is closed momentraily during the process of lowering the landing gear, but following closure of the main power switch 18 in any event. Closure of arming switch 22 completes the energizing circuit for the coil of relay V through the normally closed lower contacts Ya of relay Y. The arming switch need be pressed only long enough for the contacts of relay V to switch positions, and when that occurs a holding circuit for this relay is created through conductor 26, the contacts Vc of relay V, conductor 56, the relay coil itself, conductor 58 and normally closed contacts Ya of relay Y, to ground. The upper contacts Vd of relay V simultaneously close and connect the circuit conductor 26 to the energized conductor 20 through conductors 28 and 30, thereby energizing the solenoid valve 10 to remove braking pressure independently of the operating position of relays W, X, Y or Z.

At the same time, the lower contacts Va of relay V close to form a circuit including the field coil of relay W connected to energized conductor 26, conductor 60 and the initially open recovery contacts R, to ground. Contacts R remain open until the airplane wheel under discussion actually touches the ground and is spun thereby, but when this occurs closure of recovery contacts R necessarily results because of the nature of the wheel-speed-recovery detector described in said copending application. Relay W is then energized. This results in energization of relay X which forms the holding circuit for relay W through resistor 42 and, because relay Y's current is then greatly reduced by resistor 34, initiates the delayed release of relay Y to break the energizing circuit for relay V at 0.4 to 0.6 second after initial ground contact. This delay imposed by relay Y allows time for any minor wheel bounce to be dissipated.

Such a sequence of events, therefore, commencing with closure of recovery contacts R upon initial ground contact, represents the initiation of that phase of circuit operation which will culminate in deenergization of relays V, W and X, and in removal of the interlock and restoration of normal braking as regulated by the control apparatus, when the airplane settles steadily upon the runway.

When relay V is deenergized, which occurs once and for all during a given landing by release of relay Y, the only source of energization of the solenoid valve 10 is through continued or subsequent energization of relay X. If relay X is not released after relay V is released, then the interlock effectively continues. It continues or is prolonged in this manner even after an initial ground contact which spins the landing wheels, either until contacts R reclose for an appreciable time or until the natural "fail-safe" delay period of relay Z expires, whichever is shorter. This insures that braking will not be restored to the pilot's touch prematurely in the case of an imperfect landing, and prevents his accidentally skidding the wheels on a second or later bounce contact, for instance, as in the case of the initial touch-down, keeping in mind that the reference flywheel by which skid is detected may have slowed down so greatly between successive bounces that such a skid on the ensuing or latter contact could not be detected. It is possible, therefore, as long as the "fail-safe" natural delay period of relay Z is not exceeded, for the interlock to remain in effect as the airplane continues to bounce along the ground, each ground contact respinning the flywheel and thereby reconditioning the control circuit for operation. It is this consideration largely which dictates the maximum length of the release delay period of relay Z, being several seconds.

This abnormal and yet expectable sequence of events, attendant upon an imperfect landing, is interrupted, the interlock removed and normal controlled braking operation established by the first occurrence of a steady ground contact which closes contacts R long enough to materially discharge condenser c and thereby expedite release of relay Z to open the energizing circuit for relay X. Should this subsequent recovery signal not be received, however, before the normal release delay period of relay Z is consummated, then relay Z of its own accord will release and braking will be similarly provided in any event. If the reason for the lack of any recovery signal, as by closure of contacts R, resides in an apparatus failure then the manner of braking will be determined solely by pilot's control. If the landing is exceptionally poorly executed, so that relay Z naturally releases at a time after the flywheel had decelerated below a speed necessary for skid detection, then braking is still unrestrictedly subject to pilot's control. However, if the landing is reasonably satisfactory the braking will be automatically controlled as desired.

In respect to this arming or interlock circuit feature, it is to be noted that mere airplane weight control as a means of removing the interlock and establishing the first moment following landing after which the brakes may be applied is not a sufficient or reliable substitute for the recovery-switch-actuated arming circuit. The reason lies in the fact that the full weight of the plane is not assumed by the landing wheels until the landing run is virtually completed. Moreover, the distribution of airplane weight as between the different wheels is frequently uneven until that time. An arming or interlock circuit, or the like, broken in response to spinning of the wheels is not subject to these limitations.

We claim as our invention:

1. In automatic brake control apparatus including skid detector means operable to detect incipient skidding of a wheel and recovery detector means operable to detect approach thereof to normal running speed, but before fully attaining of such speed; control means comprising means operable to interrupt braking automatically in response to actuation of said skid detector means, means operable to restore braking automatically in response to actuation of said recovery detector means, and timing means cooperating with said brake restoring means and including delay means initiated automatically in response to actuation of said skid detector means, and means cooperating with said brake restoring means, controlled jointly by said delay means and said recovery detector means and operable to delay effectiveness of said brake restoring means if actuation of said recovery detector means occurs after termination of the delay period of said delay means.

2. Automatic brake control apparatus defined in claim 1, wherein the first-mentioned delay means comprises a circuit relay having therewith means operable to delay switching of such relay between alternate control positions responsive to a change in relay field current, and circuit means operable to vary such field current to effect a change in relay position automatically in response to actuation of the skid-detector means.

3. Automatic brake control apparatus defined in claim 1, wherein the means operable to delay effectiveness of the brake-restoring means includes further delay means having a delay period of predetermined maximum length establishing the maximum operational delay of said means delaying effectiveness of the brake restoring means, and means cooperating with said further delay means to reduce the delay period thereof below its maximum automatically in response to and in accordance with actuation of said recovery detector means before expiration of such maximum delay period.

4. Automatic brake control apparatus defined in claim 3, wherein the means operable to reduce the delay period of the further delay means is capable of such reduction only to a predetermined appreciable minimum delay period.

5. Automatic brake control apparatus defined in claim 3, wherein the further delay means comprises a circuit relay, and an electric storage circuit means connected across the field coil of such relay and opposing sudden changes of current therein, and further wherein the means operable to reduce the delay period of such further delay means comprises means operable to by-pass such storage circuit automatically in response to actuation of the skid detector means, and thereby alter the effectiveness of such storage circuit in opposing variations in field current of such circuit relay.

6. Automatic brake control apparatus defined in claim 5, wherein the circuit relay includes therewith fixed delay means operable to delay switching of such relay upon a change in relay field current to produce such switching, thereby establishing a minimum delay period of the further delay means.

7. In an automatic wheel brake control system comprising means for detecting wheel deceleration from running speed caused by initiation of skidding of the wheel, and for releasing the brake automatically thereupon to interrupt the skid and enable the wheel to accelerate toward running speed, and means for detecting thereafter the wheel's approach to running speed in advance of its full recovery thereof; two delayed action brake-restoring means separately actuated by said recovery-detecting means, the first of said brake-restoring means having a materially shorter delay period than the second thereof, and selector means operable to select either of said brake-restoring means to be operated by said recovery-detecting means, said selector means normally selecting said first brake-restoring means but including a delayed-action control element actuated by said deceleration-detecting means and operable to alter the selection from said first brake-restoring means to said second brake-restoring means upon expiration of the delay period of said control element following such actuation thereof.

8. The automatic wheel brake control system defined in claim 7, wherein the delay period of the first brake-restoring means is substantially zero and the delay period of the second brake-restoring means is materially greater in order to allow appreciable additional acceleration of the wheel following actuation of the recovery-detecting means.

9. The automatic wheel brake control system defined in claim 8, wherein the timing means comprises a selective timing device initiated automatically in response to detection of deceleration of the wheel and having a natural time period required to elapse after initiation before selective operation thereof, a first means operable when actuated to restore braking substantially immediately, a second and alternatively operable means, including a delay device, operable when actuated to restore braking after a predetermined delay, and means selectively controlled by said timing device and operable automatically in response to the advance detection of recovery of wheel speed to actuate said first means or, alternatively, said second means in the event of such advance detection occurring within or beyond the natural timing period of said selective timing device, respectively.

10. The automatic wheel brake control system defined in claim 9, wherein the selective timing means comprises delay circuit means having alternative switching positions, one such position corresponding to selection of the first brake restoring means and the other such position corresponding to selection of the second brake restoring means, and further wherein the second brake restoring means comprises delay circuit means responsive with predetermined delay after initial actuation thereof to effect brake restoring operation of said second means after such delay.

11. The automatic wheel brake control system defined in claim 9, wherein the delay device of the second brake restoring means includes delay means having a maximum natural delay period after expiration of which said second means immediately operates to restore braking independently of an advance detection of wheel recovery speed.

12. In an automatic airplane-wheel brake control system comprising means for detecting wheel deceleration from running speed caused by initiation of skidding of the wheel, and for releasing the brake automatically thereupon to interrupt the skid and enable the wheel to accelerate toward running speed, such skid-detecting means being of the type requiring spinning of the wheel initially on landing to condition such skid-detecting means for operation thereof, and means responsive to wheel speed acceleration for detecting approach of the wheel to running speed, but in advance of its attaining of full running speed, initial skid preventing means actuated at will preparatory to landing for preventing application of the brakes despite all other control influences, means operable to deactuate said initial skid preventing means automatically in response to actuation of said acceleration responsive means caused by spinning of the airplane wheel during a short initial period of landing, and timing means thereafter operable automatically to restore braking substantially immediately in response to and upon said advance detection of fully attained wheel running speed if the lapse of time between said detection of deceleration and said advance detection of full speed is shorter than a predetermined amount, following release of brakes in response to detection of skidding; and to restore braking in response to such advance detection, but with predetermined delay thereafter, if said time lapse is greater than said predetermined amount.

13. The automatic control system defined in claim 12, wherein the deactuating means responsive to the acceleration responsive means comprises delay means having a predetermined delay period substantially equal in length to the first-named predetermined delay period, initiated in response to actuation of the acceleration responsive means upon initial ground contact and operable to delay deactuation of the initial skid preventing means by further actuation of said acceleration responsive means, at least until termination of the delay period of said delay means.

14. In an automatic airplane-wheel brake control system including skid-detecting means requiring spinning of the wheel initially on landing for enabling skid-detecting operation of such means, brake releasing means automatically actuated by said skid-detecting means when the wheel begins to skid, and means responsive to wheel acceleration for restoring braking after the wheel recovers speed following such removal of brakes; the combination of initial skid preventing means actuated at will preparatory to landing for preventing application of the brakes despite all other control influence, and means operable to deactuate said initial skid preventing means automatically in response to actuation of said acceleration responsive means caused by spinning of the airplane wheel during a short initial period of landing.

15. The combination defined in claim 14, wherein the deactuating means responsive to the acceleration responsive means includes delay means having a predetermined delay period initiated in response to actuation of the acceleration responsive means upon initial ground contact and operable to delay deactuation of the initial skid preventing means by further actuation of said acceleration responsive means, at least until termination of said predetermined delay period.

16. The combination defined in claim 14, wherein the deactuating means responsive to the acceleration responsive means includes delay means having a predetermined delay period initiated in response to actuation of the acceleration responsive means upon initial ground contact and operable to delay deactuation of the initial skid preventing means by further actuation of said acceleration responsive means, at least until termination of said predetermined delay period, said deactuating means including further delay means having a materially longer predetermined maximum delay period initiated in response to actuation of said acceleration responsive means and operable to effect operation of said deactuating means automatically upon termination of such maximum delay period if not operated earlier in response to said further actuation of the acceleration responsive means after initial ground contact and spinning of the landing wheel.

17. In an automatic wheel brake control system comprising means for detecting wheel deceleration from running speed caused by initiation of skidding of the wheel, and for releasing the brake automatically thereupon to interrupt the skid and enable the wheel to accelerate toward running speed, and means for detecting thereafter the wheel's approach to running speed in advance of its full recovery thereof; apparatus controlling restoration of braking upon detection of wheel speed recovery, said apparatus comprising timing means automatically comparing the time interval between actuation of said deceleration-detecting means and subsequent actuation of said recovery-detecting means with a predetermined reference period initiated by actuation of said deceleration-detecting means, and means controlled by said automatic timing means and by said recovery-detecting means for restoring braking substantially immediately upon actuation of said recovery-detecting means if said interval is shorter than said reference period, and restoring braking after a predetermined finite delay period after actuation of said recovery-detecting means if said interval is longer than said reference period.

18. An airplane landing wheel automatic brake control system comprising, in combination with a brake means for a main landing wheel, and skid-sensing means for selectively deactuating said brake means controlled by rotation of the landing wheel to remove and restore braking thereof automatically in response to skidding of the wheel and recovery of wheel rotational speed, respectively, arming means operable preparatory to landing of the airplane to prevent braking of such landing wheel on initial ground contact thereof and thereby prevent initial skidding of such wheel, and disarming means controlled by the wheel, disabling said arming means to permit actuation of said brake means automatically in response to rolling ground contact of the wheel upon landing.

19. The system combination defined in claim 18, wherein the disarming means is controlled by the skid-sensing means to permit actuation of the brake means initially only in response to the landing wheel reaching substantially full running speed upon initial ground contact thereof.

GORDON W. YARBER.
HARRY H. HOWELL.
RUSH F. CHASE.

References Cited in the file of this patent

UNITED STATES PATENTS

| Number | Name | Date |
|---|---|---|
| 2,232,750 | Wilson | Feb. 25, 1941 |
| 2,393,031 | Eksergian | Jan. 15, 1946 |
| 2,468,199 | Hines | Apr. 26, 1949 |
| 2,515,729 | Morrison | July 18, 1950 |